June 17, 1930.  T. H. SYMINGTON  1,763,830
ABSORPTION MECHANISM
Filed Dec. 1, 1928   2 Sheets-Sheet 1
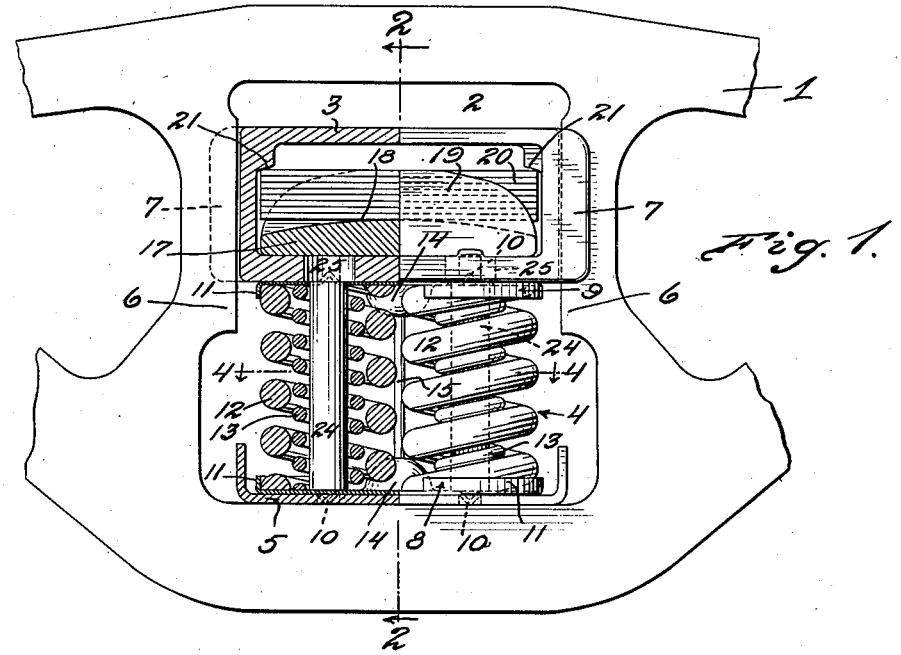
Fig. 1.
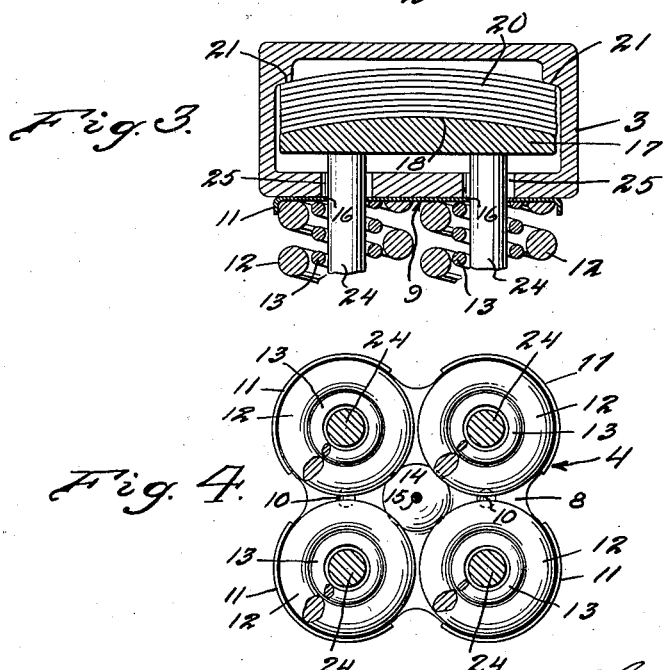
Fig. 3.
Fig. 4.
Inventor
Thomas H Symington
By
his Attorney June 17, 1930. T. H. SYMINGTON 1,763,830
ABSORPTION MECHANISM
Filed Dec. 1, 1928 2 Sheets-Sheet 2

Patented June 17, 1930

1,763,830

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

ABSORPTION MECHANISM

Application filed December 1, 1928. Serial No. 323,017.

The invention relates to railway car trucks and has special reference to the bolster and spring arrangement.

The principal object of the invention, generally stated, is to provide an absorption mechanism located within the truck bolster and adapted to operate in sequence or in parallel with the supporting springs located beneath the bolster.

It is well known that in the ordinary practice it is customary to provide a nest of any selected number, according to different requirements, of helical springs within the window opening of a truck side frame for the purpose of supporting the bolster. The objection is that under light load conditions there is but little, if any, deflection of the springs whereas under heavy load conditions the springs may be inadequate to sustain the load. As a consequence it frequently occurs that the springs go solid, as a result of which the car and its loading are subjected to unusual and severe shocks and jars which are bound to be detrimental to the mechanism and to the goods transported.

It is with the above facts in view that I have devised the present invention which has for an important object the provision of an auxiliary combined spring and friction producing mechanism located within the end portions of the truck bolster and normally inactive, that is to say, under light load conditions, but adapted to become effective when the truck springs have been depressed to a certain predetermined extent, this absorption mechanism consequently taking care of any overloads on the springs with the resultant advantage of preventing unnatural strains thereon and insuring the resilient supporting of the load.

Another object of the invention is to provide an absorption or auxiliary spring mechanism of this character which, when brought into play, will operate in parallel with the truck springs in contra-distinction to certain types of absorption mechanism wherein the operation is in series.

A further object of the invention is to provide an auxiliary resilient mechanism which may be used in conjunction with the ordinary type of spring nests, no change being required in the construction of the latter other than the provision of holes in the upper spring cap for the accommodation of the elements provided for energizing the absorption mechanism.

Yet another object of the mechanism is to provide a structure and arrangement of this character in which very slight modification of the ordinary truck bolster will be needed to permit the installation of the auxiliary equipment, the cost of embodying the improvement being consequently kept low.

Another object of the invention is to provide an absorption mechanism of this character in which the auxiliary spring means will increase the ultimate capacity of the supporting spring means without increasing the allowable travel of the bolster with respect to the side frames, it being a feature that the operating curve of the mechanism will have straight line characteristics until the auxiliary springs are brought into play, subsequently to which the operating curve will be parobolic.

Still another object is to provide a mechanism of this character in which the period of vibration of the auxiliary springs will be different from that of the helical truck springs, thereby breaking up synchronization and preventing the development of car roll or sidesway under loaded car conditions, as it is the lading which is to be protected rather than the empty car.

An additional object of the invention is to provide mechanism of this character which will be comparatively simple to make, easy and inexpensive to install, positive in action, efficient and durable in service and a general improvement in the art.

To the attainment of the foregoing and other objects and advantages, the invention preferably consists in the arrangement and combination as well as the detailed construction of parts to be hereinafter more fully described and claimed, and illustrated in the accompanying drawings, in which,—

Figure 1 is a fragmentary side elevation of a truck side frame with the truck bolster and supporting springs therefor in place, portions of the latter mentioned elements being in elevation and other portions in section, the parts being shown under light load conditions;

Figure 3 is a fragmentary cross-sectional view through the end portion of the bolster and adjacent parts with the absorption mechanism shown under compression;

Figure 4 is a cross-section taken on substantially the line 4—4 of Figure 1, showing a nest of four springs;

Figure 2:
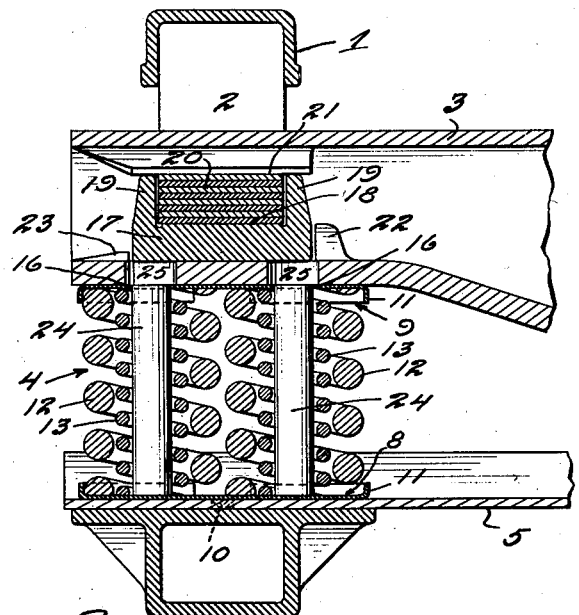
Figure 2 is a vertical longitudinal section taken on substantially the line 2—2 of Figure 1, with the parts in the same position.

Referring more particularly to the drawings, the numeral 1 designates, generally, a truck side frame of any ordinary type having the usual window opening 2 within which is mounted the truck bolster 3 supported upon a nest of springs, indicated generally at 4, these springs being carried by the ordinary spring plank 5. At the sides of the window opening 2 are the customary pedestal guides 6 engaged by lateral projections 7 on the bolster for the purpose of preventing the bolster from moving laterally with respect to the side frames while permitting it to move vertically in accordance with deflection of the bolster supporting springs.

Each spring nest is shown as comprising bottom and top caps 8 and 9 which are similar in most respects but which differ in one particular to be explained. Both caps are provided with the usual pressed-out projections 10 received within depressions or recesses in the spring plank and underside of the bolster for preventing displacement. Furthermore both caps have rounded corners, as clearly indicated in Figure 4 and at these corners are flanges 11 which constitute retaining means for helical springs 12. In the present instance I have shown other helical springs 13 which are located within the springs 12 and which consequently need no exterior retaining means. In spring nests of this type it is usual to form the top and bottom caps with substantially hemispherical inward projections 14 which provide means for attachment of a tie rod 15 provided for the purpose of initially holding the nest assembled, that is to say, for holding the caps against separation prior to the installation of the nest within the truck. The only difference between the top and bottom caps is that the former is provided with holes 16 arranged in axial relation to the springs for a purpose to be described.

Located within each end of the bolster 3 is a carrier 17, here represented as having a flat bottom surface and a convex upper surface 18 and provided at its sides with upstanding retaining flanges 19. This carrier is of a length to extend across the interior of the bolster but its width is more or less immaterial and would depend upon the desired capacity of the bank or group of plate springs 20 mounted on top of the carrier between the flanges 19. Ordinarily, that is to say, under normal conditions, the springs 20 are straight or plane and they are adapted to be flexed downwardly at their ends on account of the convex shape of the top surface of the carrier. At opposite sides the bolster is formed with inwardly projecting ledges 21 against which the ends of the uppermost plate spring abut, these ledges acting to prevent bodily upward movement of the bank of springs and insuring the upward flexing which is desired under certain conditions. To prevent displacement of the assembled carrier and springs thereon it is preferable that the bottom of the bolster be formed or otherwise provided with upstanding projections 22 and 23, the latter being nearer the ends and being of less height than the former, the difference in height being desirable so as to permit the insertion of the carrier and spring assembly from the open end of the bolster. After the carrier and spring assembly is in place it is clear that the projections 22 and 23 will prevent it from shifting longitudinally of the bolster.

The means for energizing the plate springs is represented as comprising a plurality of upstanding pins or posts 24 of rod-like form located within the inner springs 13 and having their lower ends abutting against the top of the bottom spring cap 8. The upper ends of these posts project through the holes 16 in the top cap 9 and through registering holes 25 in the bottom of the bolster so that when the springs in the nest are compressed to a certain extent the upper ends of these posts will engage against the flat bottom side of the carrier 17 and force it upwardly to flex the springs 20.

Figure 5:
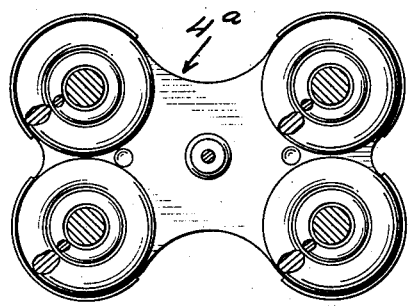
Figure 5 is a similar view showing a nest of springs of slightly different dimensions.

In Figure 5 I have represented a spring nest 4ª embodying the same general characteristics as those possessed by the above described nest 4, the only difference being the spacing of the springs apart, this being a matter which depends upon the size of the window opening in the side frame in accordance with the different accepted standards in truck design.

Figure 6:
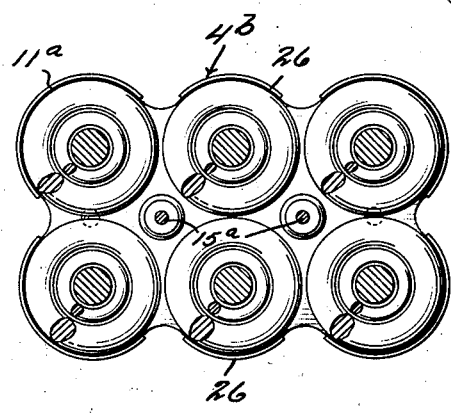
Figure 6 is a similar view showing the employment of a nest of six springs in accordance with a different accepted standard.

Figure 6 discloses still a different spring nest 4ᵇ in which there are six sets of outer and inner helical springs. In this particular type it is clear that there must be guide flanges 26 intermediate the corner flanges 11ª for retaining the intermediate springs. Furthermore, in this case there may be two tie rods 15ª corresponding to the single tie 15 of the nest 4 or 4ᵃ. Variations such as these in the spring nests and other parts are rather immaterial but these slight modifications are illustrated for the sake of clearness and to show that the invention is capable of being used in connection with spring nests of the different standard types.

Assuming that the structure has been built and assembled as shown and described, it will be apparent that under light load conditions the helical springs in the nest will be sufficient for all purposes inasmuch as they are readily capable of providing the necessary resilient support without there being any danger of excessive strain being brought upon them. However, under heavy load conditions it will be seen that after the helical springs have been depressed to the proper and safe extent, the upper ends of the posts 25 will come into engageemnt with the carrier 17 and cause flexure of the plate springs 20, these springs then acting in parallel with the helical springs in the nest and giving sufficient additional capacity to take care of conditions which may arise. The plate springs 20 afford not only spring resistance but also frictional resistance to downward movement of the bolster and it is consequently apparent that the total capacity of the helical and plate springs combined will be greater than could be obtained by the use of the nest of springs with an additional group of helical springs.

In view of the fact that the helical springs perform their function alone up to a certain point, the working curve throughout their travel will be substantially a straight line which merges into the parabolic curve of the work which takes place when the plate springs come into play. Another feature of advantage is that under heavy load conditions there can be no synchronization of the helical springs and plate springs as their periods of vibration are inherently different. This prevents "jiggling" and also prevents the development of car roll or sidesway such as tends to occur when the truck wheels pass over the rail joints at certain speeds. The benefits resulting from the elimination of jiggling and car roll are sufficiently well known that a detailed description should be unnecessary.

While I have shown and described a prefered embodiment of the invention, it should be understood that the disclosure is merely an exemplification of the principles involved and that the right is reserved to make all such changes in the details of construction and also the arrangement and combination of parts as may not depart from the underlying principle of the invention or the scope of the claims hereunto appended.

Having thus described the invention, I claim:

1. In a railway car truck, side frames, a bolster mounted therein, a nest of supporting springs beneath each end of the bolster, auxiliary springs mounted within each end of the bolster and adapted to operate in parallel with the first named springs, and a movable carrier for the auxiliary springs partially embracing the same.

2. In a railway car truck, side frames, a bolster mounted therein, a nest of supporting springs beneath each end of the bolster, and normally flat auxiliary springs mounted within each end of the bolster and adapted to operate in parallel with the first named springs, said second named springs being capable of upward bowing at their centers and of developing friction for opposing additional resistance to downward movement of the bolster.

3. In a railway car truck, side frames having window openings therein, a bolster projecting through said window openings, a nest of helical springs within each window opening for supporting the end portions of the bolster, auxiliary spring means located within each end of the bolster, means adapted to cooperate with said auxiliary springs for energizing them in parallel with the helical springs upon compression of the latter beyond a pre-determined extent, and a carrier for the auxiliary springs having upstanding side flanges overlapping the edges thereof.

4. In a railway car truck, side frames having window openings therein, a bolster projecting through said window openings, a nest of helical springs within each window opening for supporting the end portions of the bolster, auxiliary spring means located within each end of the bolster, means adapted to cooperate with said auxiliary springs for energizing them in parallel with the helical springs upon compression of the latter beyond a pre-determined extent, said auxiliary springs being of plate form and arranged in a carrier and being adapted to be flexed, and means on the inner surface of the bottom of the bolster cooperating with the carrier for retaining it in position.

5. In a railway car truck including side frames, a bolster and a nest of helical springs for supporting the bolster, absorption mechanism comprising a carrier located within each end of the bolster, a bank of normally straight plate springs mounted on the carrier, and means engageable with the carrier for moving the same upwardly to flex the plate springs upwardly at their center when the helical springs have been depressed beyond a predetermined extent.

6. In a railway car truck including side frames, a bolster and a nest of helical springs for supporting the bolster, absorption mechanism comprising a carrier located within each end of the bolster, a bank of plate springs mounted on the carrier, and means engageable with the carrier for moving the same upwardly to flex the plate springs when the helical springs have been depressed beyond a predetermined extent, said carrier having a convex top surface and the opposite sides of the bolster being provided with ledges, said ledges being engaged by the upper ends of the bank of plate springs and the center of the bottom of the bank engaging upon said convex surface of the carrier.

7. In a railway car truck, side frames, a bolster projecting therethrough, a nest of supporting springs of helical form beneath the end of the bolster, top and bottom caps for the nest, the top cap and the bottom of the bolster having registering holes therein, upstanding posts mounted on the bottom cap and adapted to project through said holes, an absorption mechanism within each end of the bolster including a carrier and a bank of plate springs mounted thereon, the plate springs adapted to be flexed and placed under strain upon engagement of the carrier by the upper ends of said posts when the nest of springs is compressed beyond a pre-determined extent.

8. In a railway car truck including side frames, a bolster and a nest of helical springs for supporting the bolster, shock absorbing means comprising a carrier located within each end of the bolster, a bank of plate springs engaged upon the carrier, said carrier having portions embracing the plate springs for preventing relative lateral displacement thereof, and abutment lugs on the inside of the bottom wall of the bolster receiving the carrier between them for retaining it in position.

9. In a railway car truck including side frames, a bolster and a nest of helical springs for supporting the bolster, shock absorbing means comprising a carrier located within each end of the bolster, a bank of plate springs engaged upon the carrier, said carrier having portions embracing the plate springs for preventing relative lateral displacement thereof, and abutment lugs on the inside of the bottom wall of the bolster receiving the carrier between them for retaining it in position, the lug nearer the end of the bolster having an inclined upper surface upon which the carrier may ride during insertion within the bolster.

In testimony whereof I affix my signature.

THOMAS H. SYMINGTON.